US008215768B2

(12) United States Patent
Oestereich et al.

(10) Patent No.: US 8,215,768 B2
(45) Date of Patent: Jul. 10, 2012

(54) TELESCOPIC SPECTACLES

(75) Inventors: Micha Oestereich, Tel Aviv (IL); Adi Kremer, Kfar Yona (IL)

(73) Assignee: TopSight Optics Ltd., Ariel (IL)

( * ) Notice: Subject to any disclaimer, the term of this patent is extended or adjusted under 35 U.S.C. 154(b) by 133 days.

(21) Appl. No.: 12/811,380

(22) PCT Filed: Feb. 12, 2009

(86) PCT No.: PCT/IL2009/000175
§ 371 (c)(1),
(2), (4) Date: Jul. 1, 2010

(87) PCT Pub. No.: WO2009/101628
PCT Pub. Date: Aug. 20, 2009

(65) Prior Publication Data
US 2010/0302503 A1     Dec. 2, 2010

Related U.S. Application Data

(60) Provisional application No. 61/028,527, filed on Feb. 14, 2008.

(51) Int. Cl.
*G02C 1/00* (2006.01)
(52) U.S. Cl. ........................................ 351/158; 359/399
(58) Field of Classification Search .............. 351/41, 351/158; 359/399, 400, 401, 407, 815
See application file for complete search history.

(56) References Cited

U.S. PATENT DOCUMENTS

| 1,610,553 | A | 10/1924 | Jones |
| 2,710,560 | A | 5/1949 | Thompson |
| 3,273,456 | A | 9/1966 | Feinbloom |
| 3,410,638 | A | 11/1968 | Langworthy |
| 3,865,468 | A | 2/1975 | Holcomb |
| 3,945,712 | A | 3/1976 | Crock et al. |
| 4,540,238 | A | 9/1985 | Edwards |
| 4,704,000 | A | 11/1987 | Pekar et al. |
| 4,795,235 | A | 1/1989 | Spitzberg |
| 4,834,525 | A | 5/1989 | Vansaghi |
| 4,877,316 | A | 10/1989 | Edwards et al. |
| 4,973,130 | A | 11/1990 | Gernet |
| 5,028,127 | A | 7/1991 | Spitzberg |

(Continued)

FOREIGN PATENT DOCUMENTS
FR        401027 A    8/1909

OTHER PUBLICATIONS

Chinese Patent Application # 200980104183.9 Official Action dated Jul. 20 2011.

(Continued)

*Primary Examiner* — Huy K Mai
(74) *Attorney, Agent, or Firm* — D. Kligler I.P. Services Ltd.

(57) ABSTRACT

Optical apparatus (20, 60) includes a spectacle frame (30, 64) configured to be worn by a user (22). A telescope (26, 62) is fixed to the spectacle frame and includes an objective (44), an eyepiece (28), and multiple optical surfaces (48, 56, 58) defining a folded optical path for providing a magnified image to an eye (40) of the user while at least one of the optical surfaces is located at least partially posterior to a coronal plane (41) located at a rear surface of the eyepiece.

22 Claims, 6 Drawing Sheets

U.S. PATENT DOCUMENTS

| | | | |
|---|---|---|---|
| 5,076,682 A | 12/1991 | Pasfield | |
| 5,129,717 A | 7/1992 | Feinbloom | |
| 5,151,722 A | 9/1992 | Massof et al. | |
| 5,249,002 A | 9/1993 | Chou et al. | |
| 5,291,229 A | 3/1994 | Feinbloom | |
| 5,321,547 A | 6/1994 | Zapp | |
| 5,394,272 A | 2/1995 | Kvamme et al. | |
| 5,446,507 A | 8/1995 | Chang | |
| 5,463,500 A | 10/1995 | Buchroeder | |
| 5,627,690 A | 5/1997 | Caplan et al. | |
| 5,680,194 A | 10/1997 | Pasfield | |
| 5,680,195 A | 10/1997 | Pekar et al. | |
| 5,923,467 A | 7/1999 | Pericic et al. | |
| 6,002,517 A | 12/1999 | Elkind | |
| 6,055,098 A | 4/2000 | Lett | |
| 6,061,189 A | 5/2000 | Caplan et al. | |
| 6,065,835 A | 5/2000 | Pekar et al. | |
| 6,163,413 A | 12/2000 | Caplan et al. | |
| 6,201,640 B1 | 3/2001 | Caplan et al. | |
| 6,362,918 B1 | 3/2002 | Netzer | |
| 6,667,832 B2 | 12/2003 | Caplan et al. | |
| 6,671,090 B2 | 12/2003 | Luecke et al. | |
| 6,704,142 B2 | 3/2004 | Caplan et al. | |
| 6,729,735 B2 | 5/2004 | Bleier | |
| 6,775,060 B2 | 8/2004 | Peli et al. | |
| 6,799,847 B2 | 10/2004 | Caplan | |
| 6,972,903 B2 | 12/2005 | Hara et al. | |
| 7,242,522 B2 * | 7/2007 | Kanai | 359/415 |
| 7,374,284 B2 | 5/2008 | Peli | |

OTHER PUBLICATIONS

International Application PCT/IL2009/000175 Search Report dated May 27, 2009.

European Patent Application # 09710548.0 Search report dated Jan. 5, 2012.

* cited by examiner

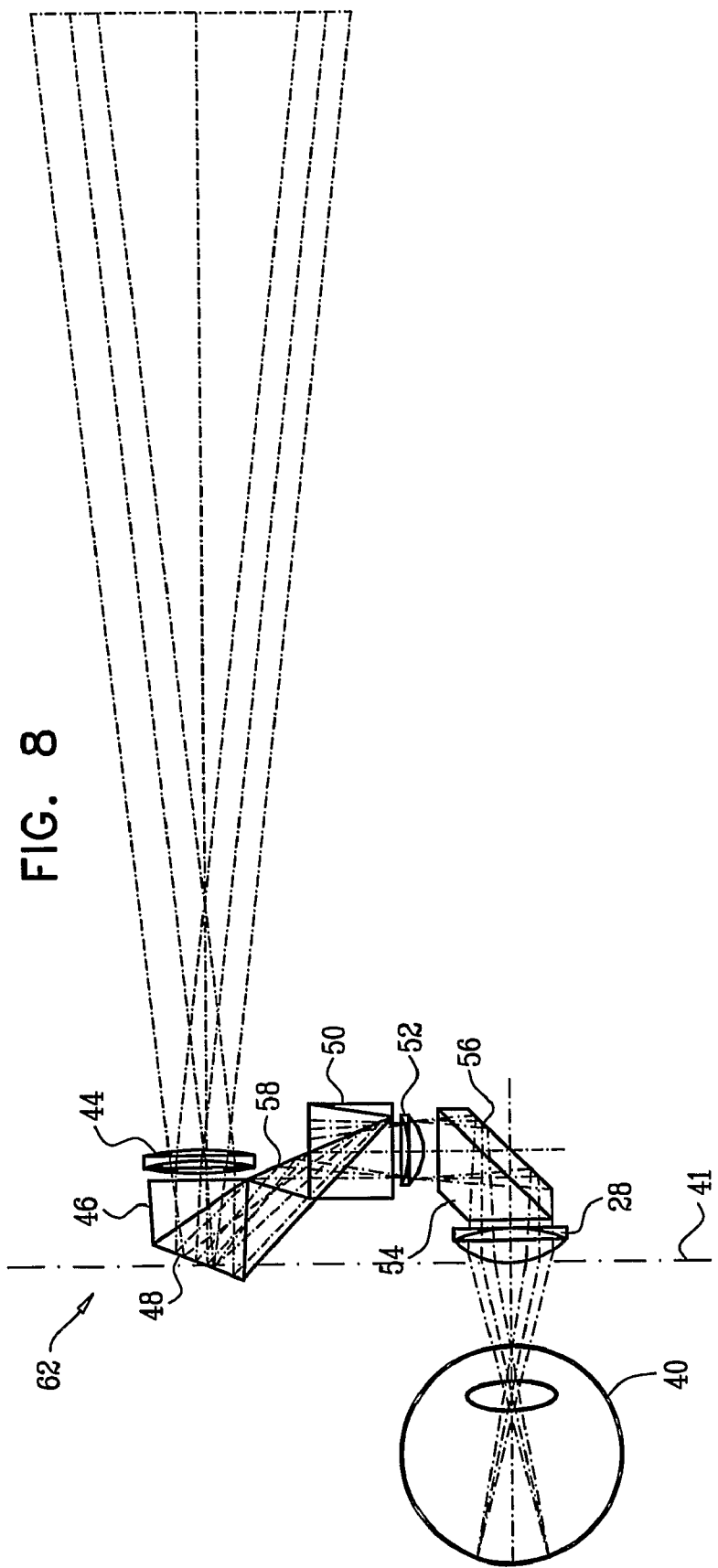

TELESCOPIC SPECTACLES

CROSS-REFERENCE TO RELATED APPLICATION

This application claims the benefit of U.S. Provisional Patent Application No. 61/028,527, filed Feb. 14, 2008, which is incorporated herein by reference.

FIELD OF THE INVENTION

The present invention relates generally to optical devices, and specifically to spectacle-mounted visual aids.

BACKGROUND OF THE INVENTION

Various low-vision devices are available to improve the eyesight of people with macular degeneration. For example, there are a variety of magnifiers that enlarge print to make it easier to read. Such magnifiers include spectacles, telescopes, handheld or stand-alone magnifying glasses, and closed-circuit television devices.

A number of telescopic devices have been developed for mounting on spectacle frames or embedding in spectacle lenses. For example, miniature Galilean or Keplerian telescopes may be fitted into bores made through the spectacle lenses (typically in the upper part of the lenses). As another example, U.S. Pat. No. 5,680,194 describes a periscopic telemicroscope for spectacles, which mounts over the periphery of one of the spectacle lenses. As yet another example, U.S. Pat. No. 6,972,903 describes a vision assisting apparatus that includes a casing for forming an inversely U-shaped optical path, with an attaching structure for attaching the casing to a wearer so that the light exit is positioned close to an eye of the wearer.

An alternative type of arrangement is suggested by U.S. Pat. No. 6,775,060, which describes a bioptic telescope that is at least partially embedded in a spectacle lens. In one embodiment, the telescope includes a plurality of optical elements defining an optical path for viewing an object, such that at least a portion of the optical path is located within the spectacle lens in a plane substantially orthogonal to the vision axis.

SUMMARY OF THE INVENTION

Embodiments of the present invention that are described hereinbelow provide improved telescopic spectacles, with a folded optical path. In some embodiments, the design takes advantage of space available within the bounds of the spectacle frame in order to lengthen the optical path, in order to achieve high magnification while maintaining a compact profile that is comfortable and unobtrusive for the user. The telescope may be integrated into the spectacle frame so as to appear aesthetically as a single unit.

There is therefore provided, in accordance with an embodiment of the present invention, optical apparatus, including a spectacle frame configured to be worn by a user. A telescope is fixed to the spectacle frame and includes an objective, an eyepiece, and multiple optical surfaces defining a folded optical path for providing a magnified image to an eye of the user while at least one of the optical surfaces is located at least partially posterior to a coronal plane located at a rear surface of the eyepiece.

In one embodiment, the telescope is contained inside a body of the spectacle frame. Typically, the apparatus includes a pair of telescopes fixed to the spectacle frame, for providing magnified images to both eyes of the user. In some embodiments, the spectacle frame includes a bridge piece and temples, and the at least one of the optical surfaces is located adjacent to a temple of the spectacle frame.

In some embodiments, the at least one of the optical surfaces is a reflective surface, which folds the optical path at an acute angle, wherein the reflective surface is located on the optical path between the objective and the eyepiece. The objective is located adjacent to a temple of the spectacle frame in a position anterior to the reflective surface. In one embodiment, the reflective surface posterior to the coronal plane includes a first reflective surface, and the telescope includes at least a second reflecting surface located anterior to the coronal plane between the first reflective surface and the eyepiece for directing the optical path toward the eye. Optionally, the telescope includes an Amici roof prism, and the second reflecting surface includes a roof face of the Amici roof prism.

In a disclosed embodiment, the telescope includes a Keplerian telescope. The at least one of the optical surfaces may be located at least partially posterior to a further coronal plane located at a front surface of the eye.

In some embodiments, the apparatus includes a spectacle lens held in a first area within the spectacle frame, while the telescope is fixed in a second area within the spectacle, frame, so as to allow the user to view objects alternatively through the spectacle lens and through the telescope while wearing the spectacle frames. Typically, the first area is a lower area of the spectacle frame, while the second area is an upper area of the spectacle frame, and the spectacle lens is chosen so as to provide a refractive vision correction to the user.

There is also provided, in accordance with an embodiment of the present invention, a method for magnification, including providing a telescope including an objective, an eyepiece, and multiple optical surfaces defining a folded optical path. The telescope is fixed to a spectacle frame so that when a user wears the spectacle frame, the telescope provides a magnified image to an eye of the user while at least one of the optical surfaces is located at least partially posterior to a coronal plane located at a rear surface of the eyepiece.

The present invention will be more fully understood from the following detailed description of the embodiments thereof, taken together with the drawings in which:

BRIEF DESCRIPTION OF THE DRAWINGS

FIG. 8 is an optical ray diagram that schematically shows optical components used in telescopic spectacles in accordance with an embodiment of the present invention.

DETAILED DESCRIPTION OF EMBODIMENTS

Figure 1:
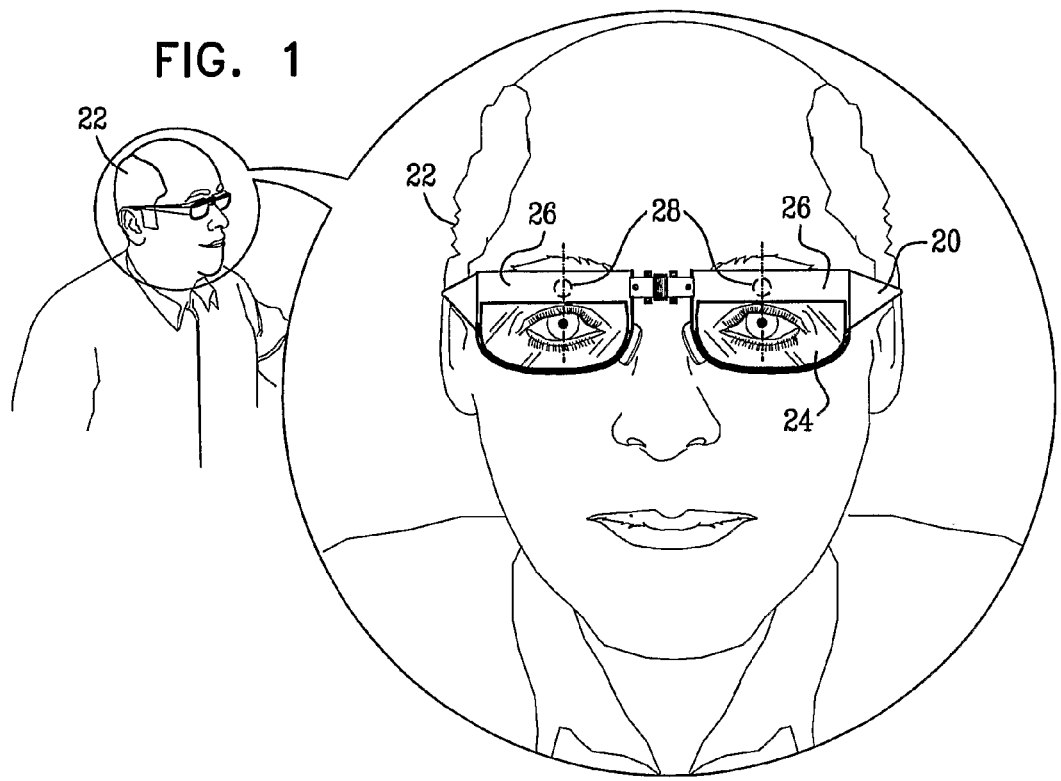
FIG. 1 is a schematic, pictorial illustration showing telescopic spectacles worn by a user, in accordance with an embodiment of the present invention.
Figure 2:
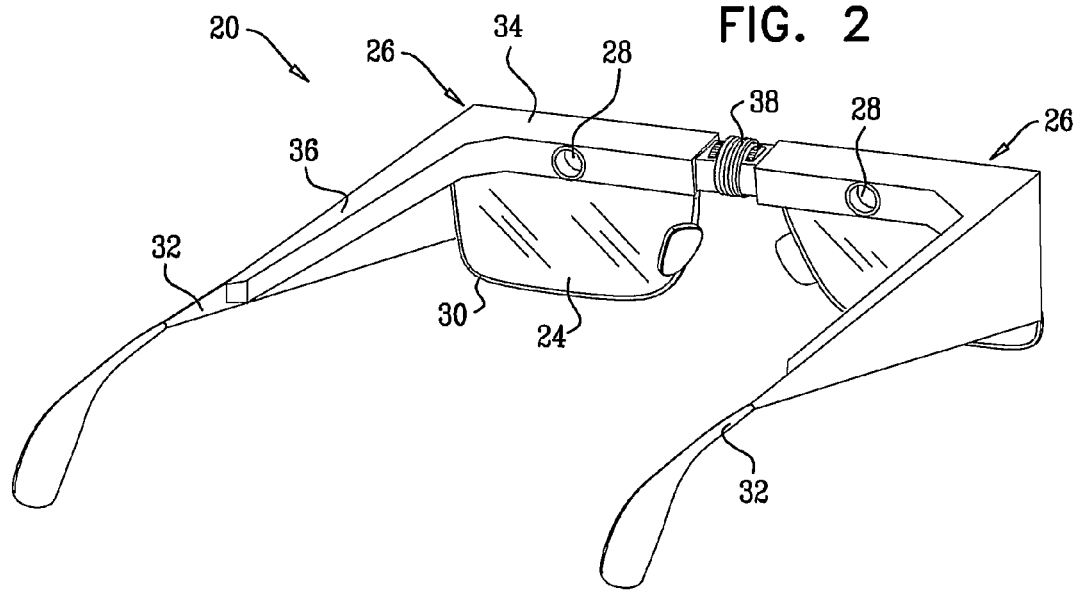
FIG. 2 is a schematic, pictorial view of telescopic spectacles in accordance with an embodiment of the present invention.

Reference is now made to FIGS. 1 and 2, which are schematic, pictorial illustrations showing telescopic spectacles 20, in accordance with an embodiment of the present invention. In FIG. 1, the spectacles are worn by a user 22, while FIG. 2 shows the spectacles from the user's inside point of view. The spectacles comprise a frame 30, which comprises a bridge piece 34 and temples 32. (The bridge piece refers to the part of the frame that sits on the bridge of the nose, while the temples extend along the sides of the user's face and mount over the ears.)

Frame 30 typically contains spectacle lenses 24 in one area and dual telescopes 26 in another area. Typically, the telescopes are held in the upper area of the frames, as shown in the figures, while the spectacle lenses occupy the lower area, but other arrangements are also possible. Spectacle lenses 24 may be chosen to provide a refractive vision correction to the user. Alternatively, if no refractive correction is needed or desired, the spectacle lenses may simply comprise transparent blanks or may be omitted altogether.

Telescopes 26 are contained in a housing 36, which extends both across bridge piece 34 and along temples 32. The housing contains telescopic optics, which define an optical path that extends along the inside of the temples, as described in detail hereinbelow. The housing is typically designed fit inside the spectacle frames, and may actually be integrated into the spectacle frames, as shown in the figures, so as to maintain a compact, unobtrusive appearance. The front surface of the housing, above spectacle lenses 24, may be coated with a reflective coating, for example, so as to blend with the spectacle lenses as though they were a single unit. The rear surface of the housing, including the optical path that it contains, extends inward beyond the adjacent inner surfaces of lenses 24, particularly in the corners of the frame where the temples meet the bridge piece.

For proper viewing through telescopes 26, it is important that eyepieces 28 of the telescopes are well aligned with the user's eyes (as illustrated in FIG. 1). To facilitate such alignment, bridge piece 34 may comprise an adjustment mechanism 38, which shifts the telescopes transversely. Optionally, the adjustment mechanism may comprise two separate controls, for aligning eyepieces 28 individually with each of the user's eyes.

Figure 3A:
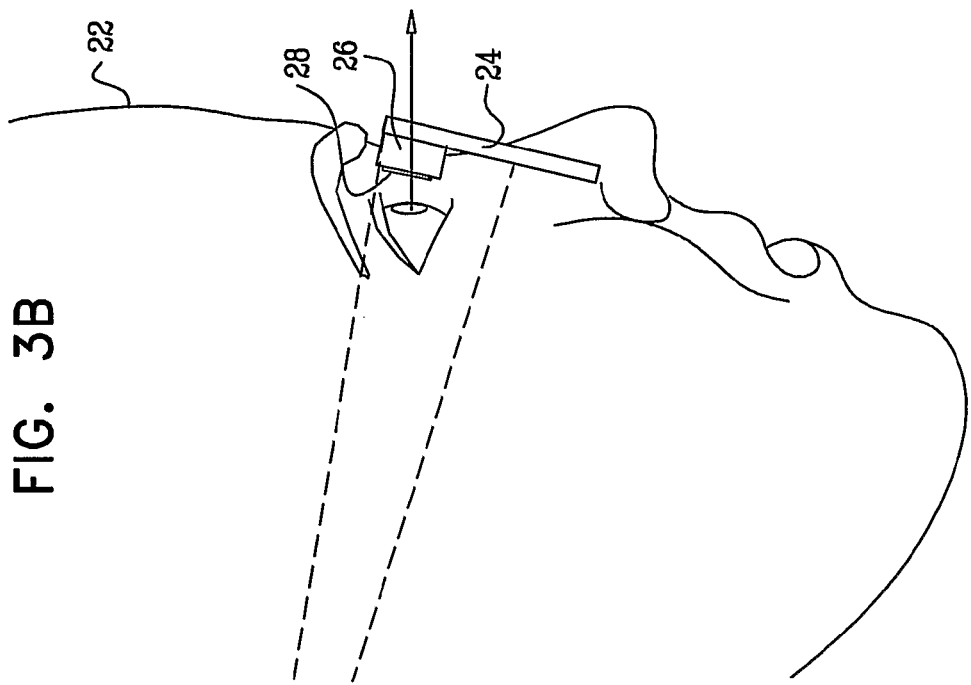
FIGS. 3A and 3B are schematic profile views of a user wearing telescopic spectacles and looking through the spectacles at two different viewing angles, in accordance with an embodiment of the present invention.
Figure 3B:
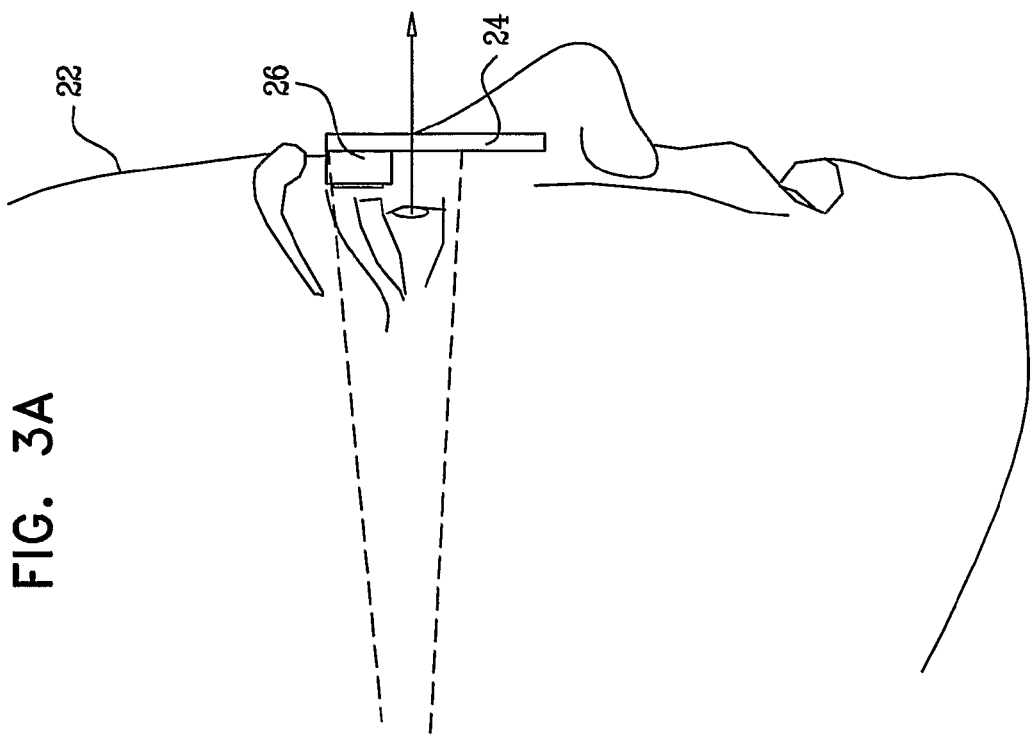

FIGS. 3A and 3B are schematic profile views of user 22 wearing telescopic spectacles 20 and looking through the spectacles at two different viewing angles, in accordance with an embodiment of the present invention. For normal distance vision, the user looks directly through spectacle lenses 24, as shown in FIG. 3A. To use telescopes 26, the user inclines his head slightly downward and looks slightly upward, as shown in FIG. 3B, so that the pupils of his eyes are aligned with eyepieces 28.

Figure 4:
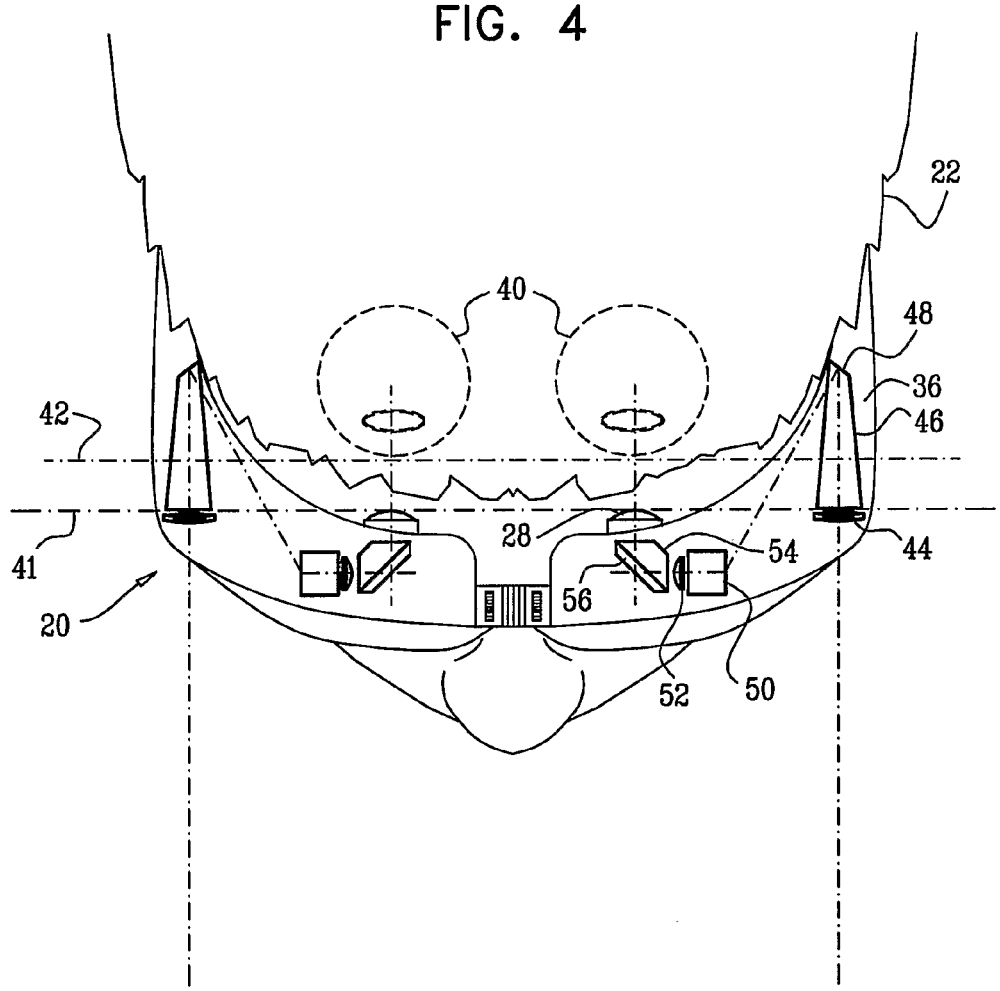
FIG. 4 is a schematic top view of telescopic spectacles worn by a user, in accordance with an embodiment of the present invention.

FIG. 4 is a schematic top view of telescopic spectacles 20 worn by user 22, in accordance with an embodiment of the present invention. The user's eyes 40 are aligned with respective eyepieces 28. The rear surfaces of the eyepieces (i.e., the surfaces closest to the user's eyes) define a first coronal plane 41. The front surfaces of the eyes (i.e., the corneas) define a second coronal plane 42. A "coronal plane" (also known as a frontal plane) refers to any vertical plane that divides the body into anterior and posterior (belly and back) sections. "Vertical" is used here in the usual sense to mean parallel to the long (spinal) axis of the body. The relevant examples of a coronal planes in the present case are planes 41 and 42, which pass through the face at the nose or the front surface of the eyes.

Each of telescopes 26 comprises an objective 44, which is located adjacent to the temple of spectacles 20. The optical path of the rays that are focused by each objective passes through a prism 46, which is also adjacent to the temple. The optical path crosses coronal plane 41. In this embodiment, the optical path also crosses coronal plane 42 and is then folded at an acute angle by a rear reflective surface 48 of prism 46, which is located posterior to plane 42. The optical rays are thus reflected forward to a deflector 50 and focused by a field lens 52. The rays are then turned toward eyepiece 28 by a reflective roof face 56 of an Amici roof prism 54, anterior to planes 41 and 42.

The telescope design that is shown in FIG. 4 thus takes advantage of unused space within the corners of the spectacle frames, adjacent to temples 32. This design provides both a long optical path—and thus high magnification, typically on the order of 2.2X to 4X—and an unobtrusive, aesthetic outward appearance. To enhance the magnification while maintaining small dimensions, the lenses in the telescope may comprise aspheric and/or diffractive optical elements, as are known in the art. Although the telescopes shown in FIG. 4 are of the Keplerian type, other types of telescopes, including Galilean types and reflective types (with curved reflective surfaces), for example, may likewise be designed on the model shown in this figure, with folded optical paths extending behind plane 41 and possibly behind plane 42. The telescope may contain a movable element (not shown) to permit focal adjustment. The above sorts of design are also suitable for monocular spectacle-mounted telescopes.

Figure 5:
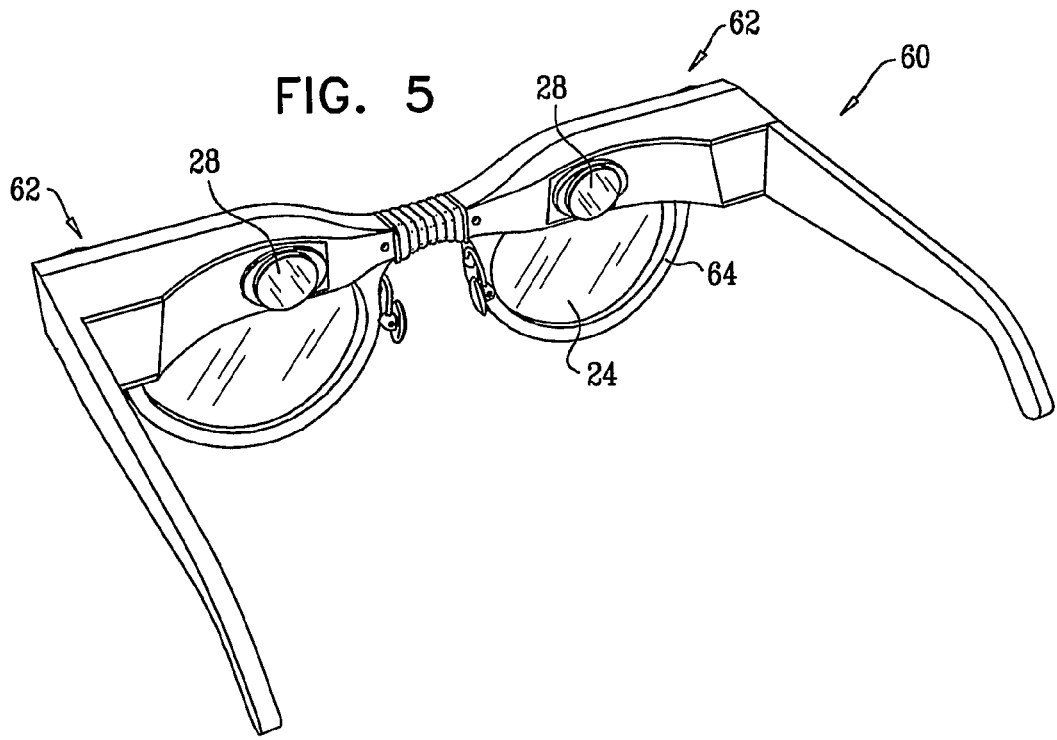
FIGS. 5 and 6 are schematic, pictorial back and front views, respectively, of telescopic spectacles in accordance with another embodiment of the present invention.
Figure 6:
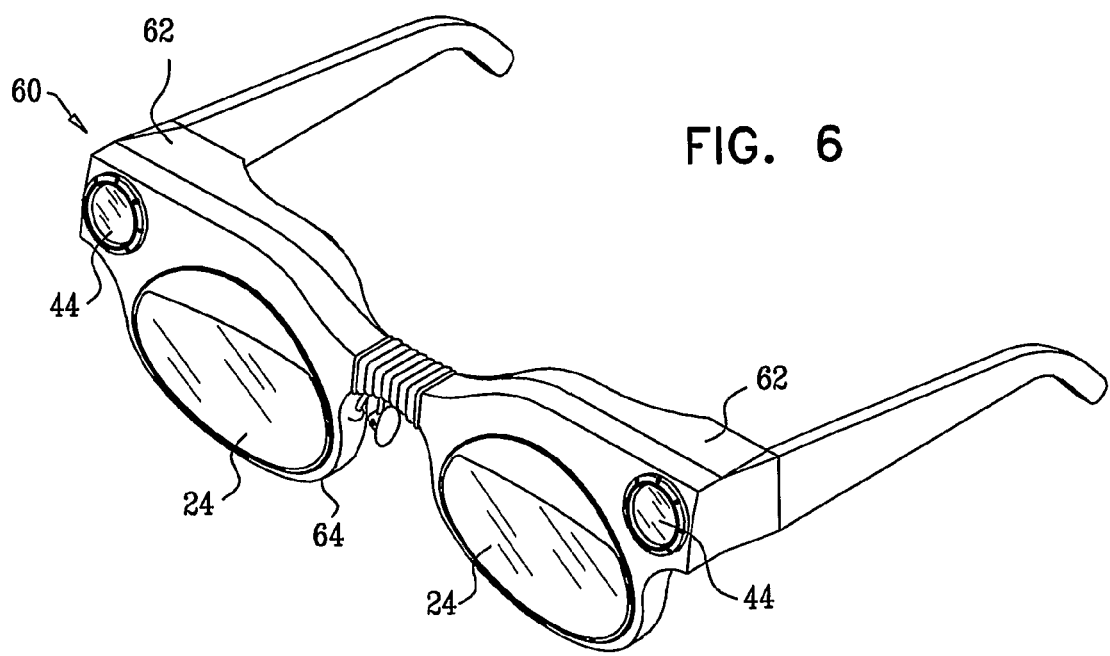

FIGS. 5 and 6 are schematic, pictorial back and front views, respectively, of telescopic spectacles 60 in accordance with another embodiment of the present invention. Spectacles comprise dual telescopes 62, which are integrated with frames 64. The principles of the design and operation of spectacles 60 are similar to those of spectacles 20, as described above, and like elements are labeled with the same numbers in both embodiments. Spectacles 60 are advantageous, however, in that telescopes 62 are integrated into the body of the spectacle frames. Spectacles 60 with telescopes 62 thus appear visually to the observer to be a single unit, rather than as a telescope added onto a pair of spectacles.

Figure 7:
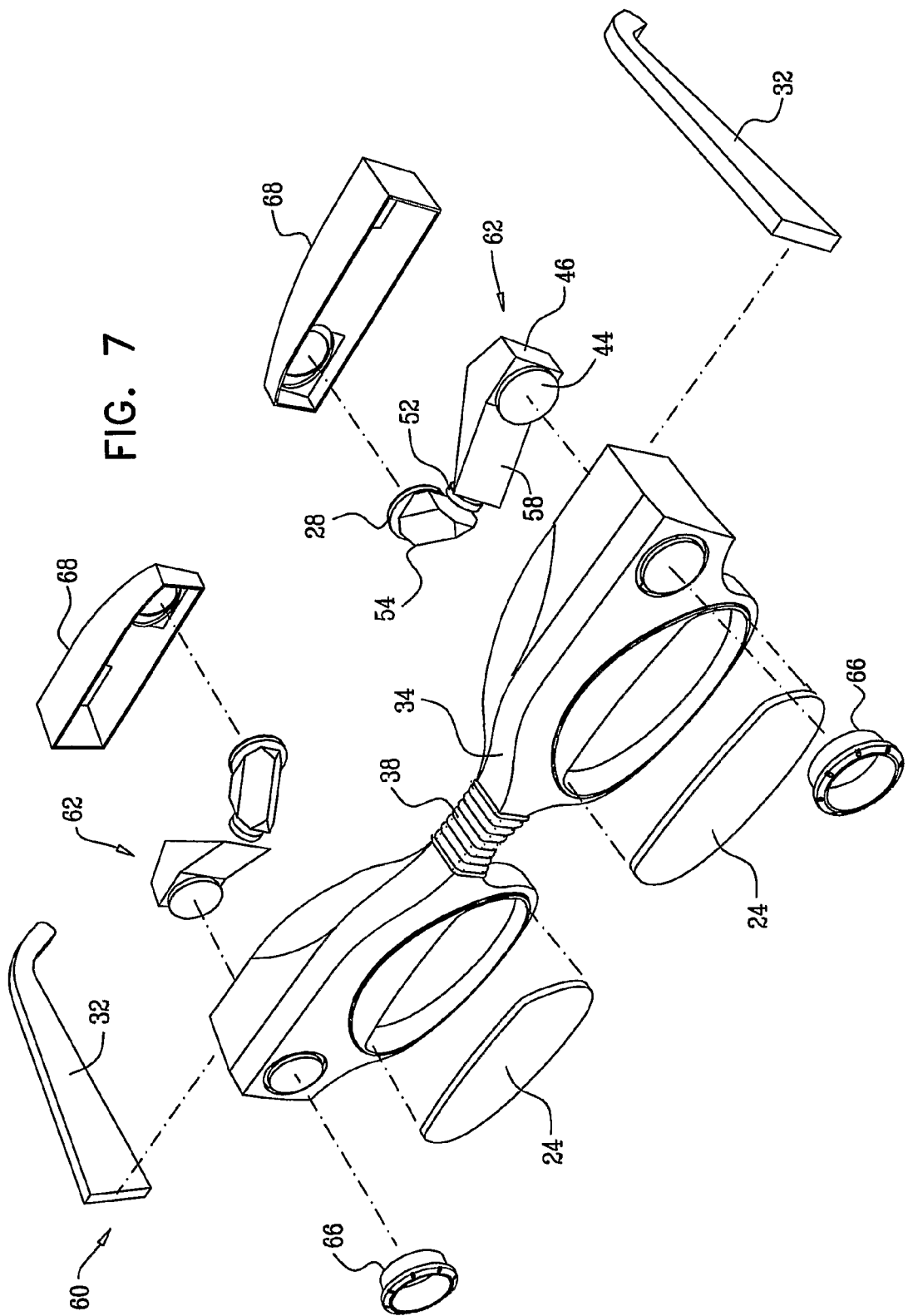
FIG. 7 is a schematic, exploded view of the telescopic spectacles of FIGS. 5 and 6, in accordance with an embodiment of the present invention.

FIGS. 7 and 8 schematically show internal details of spectacles 60, in accordance with an embodiment of the present invention. FIG. 7 is an exploded view of the spectacles, while FIG. 8 is an optical ray diagram showing the optical components that are used in telescopes 62. Certain components in this embodiment, particularly prism 46, are foreshortened relative those in spectacles 20, but the principles of operation of the design shown in FIGS. 7 and 8 are similar to those used in the embodiment of FIG. 4.

As shown in FIG. 8, rays focused by objective 44 pass through prism 46 and are folded at an acute angle by reflecting surface 48. At least a portion of surface 48 is located behind plane 41, which is the coronal plane defined by the rear surface of eyepiece 28, as explained above. A further reflective surface 58 associated with deflector 50 turns the rays along a transverse axis, perpendicular to the optical axis of eye 40. Roof face 56 of Amici roof prism 54 then turns the rays toward the eye, through eyepiece 28. The Amici roof prism has the effect of inverting the image, so that the user sees an erect image through the telescope.

As shown in FIG. 7, telescopes 62 are fitted into a hollow area within the upper part of the body of bridge piece 34 of spectacles 60. Objectives 44 are secured in place by retaining rings 66, while rear covers 68 enclose the telescopes from behind. Although FIG. 8 shows surface 58 to be a part of deflector 50, surface 58 may alternatively be fabricated as an integral part of prism 46, as shown in FIG. 7.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optical apparatus, comprising:
   a spectacle frame, which is configured to be worn by a user and comprises a bridge piece and temples; and
   a telescope, which is fixed to the spectacle frame and which comprises an objective adjacent to a temple of the frame, an eyepiece, and multiple optical surfaces defining a folded optical path for providing a magnified image to an eye of the user while at least one of the optical surfaces is a reflective surface adjacent to the temple, which is located on the optical path between the objective and the eyepiece and at least partially posterior to a coronal plane located at a rear surface of the eyepiece, such that the optical path enters the telescope by passing through the coronal plane in a posterior direction, and is then reflected by the reflective surface to pass back through the coronal plane in an anterior direction, and thereafter passes through the rear surface of the eyepiece in the posterior direction.

2. The apparatus according to claim 1, wherein the telescope is contained inside a body of the spectacle frame.

3. The apparatus according to claim 1, wherein the apparatus comprises a pair of telescopes fixed to the spectacle frame, for providing magnified images to both eyes of the user.

4. The apparatus according to claim 1, wherein the reflective surface folds the optical path at an acute angle.

5. The apparatus according to claim 4, wherein the reflective surface posterior to the coronal plane comprises a first reflective surface, and wherein the telescope comprises at least a second reflecting surface located anterior to the coronal plane between the first reflective surface and the eyepiece for directing the optical path toward the eye.

6. The apparatus according to claim 5, wherein the telescope comprises an Amici roof prism, and wherein the second reflecting surface comprises a roof face of the Amici roof prism.

7. The apparatus according to claim 1, wherein the telescope comprises a Keplerian telescope.

8. The apparatus according to claim 1, and comprising a spectacle lens held in a first area within the spectacle frame, while the telescope is fixed in a second area within the spectacle frame, so as to allow the user to view objects alternatively through the spectacle lens and through the telescope while wearing the spectacle frame.

9. The apparatus according to claim 8, wherein the first area is a lower area of the spectacle frame, while the second area is an upper area of the spectacle frame.

10. The apparatus according to claim 8, wherein the spectacle lens is chosen so as to provide a refractive vision correction to the user.

11. The apparatus according to claim 1, wherein the at least one of the optical surfaces is located at least partially posterior to a further coronal plane located at a front surface of the eye.

12. A method for magnification, comprising:
    providing a telescope comprising an objective, an eyepiece, and multiple optical surfaces, wherein the optical surfaces comprise a reflective surface and define a folded optical path on which the reflective surface is located between the objective and the eyepiece; and
    fixing the telescope to a spectacle frame comprising a bridge piece and temples with the objective and the reflective surface adjacent to a temple of the frame so that when a user wears the spectacle frame, the telescope provides a magnified image to an eye of the user while the reflective surface is located at least partially posterior to a coronal plane located at a rear surface of the eyepiece, such that the optical path enters the telescope by passing through the coronal plane in a posterior direction, and is then reflected by the reflective surface to pass back through the coronal plane in an anterior direction, and thereafter passes through the rear surface of the eyepiece in the posterior direction.

13. The method according to claim 12, wherein fixing the telescope comprises enclosing the telescope inside a body of the spectacle frame.

14. The method according to claim 12, wherein fixing the telescope comprises fixing a pair of telescopes to the spectacle frame, so as to provide magnified images to both eyes of the user.

15. The method according to claim 12, wherein the reflective surface folds the optical path at an acute angle.

16. The method according to claim 15, wherein the reflective surface posterior to the coronal plane comprises a first reflective surface, and wherein the telescope comprises at least a second reflecting surface located anterior to the coronal plane between the first reflective surface and the eyepiece for directing the optical path toward the eye.

17. The method according to claim 16, wherein the telescope comprises an Amici roof prism, and wherein the second reflecting surface comprises a roof face of the Amici roof prism.

18. The method according to claim 12, wherein the telescope comprises a Keplerian telescope.

19. The method according to claim 12, and comprising mounting a spectacle lens in a first area within the spectacle frame, while the telescope is fixed in a second area of the spectacle frame, so as to allow the user to view objects alternatively through the spectacle lens and through the telescope while wearing the spectacle frames.

20. The method according to claim 19, wherein the first area is a lower area of the spectacle frame, while the second area is an upper area of the spectacle frame.

21. The method according to claim 19, wherein the spectacle lens is chosen so as to provide a refractive vision correction to the user.

22. The method according to claim 12, wherein the at least one of the optical surfaces is located at least partially posterior to a further coronal plane located at a front surface of the eye.

\* \* \* \* \*